United States Patent [19]

Song

[11] Patent Number: 4,578,851
[45] Date of Patent: Apr. 1, 1986

[54] TOOL

[76] Inventor: In W. Song, 757 S. Berendo, Los Angeles, Calif. 90005

[21] Appl. No.: 635,502

[22] Filed: Jul. 30, 1984

Related U.S. Application Data

[63] Continuation-in-part of Ser. No. 397,818, Jul. 13, 1982, abandoned.

[51] Int. Cl.[4] .............................................. B23P 19/02
[52] U.S. Cl. ..................................................... 29/235
[58] Field of Search .................... 29/235, 451; 404/87, 404/74

[56]    References Cited

U.S. PATENT DOCUMENTS

| | | | |
|---|---|---|---|
| 2,354,586 | 7/1944 | Fischer | 404/74 |
| 3,307,249 | 3/1967 | Hohoff | 29/235 |
| 3,981,066 | 9/1976 | Calvert | 29/451 |
| 4,003,122 | 1/1977 | Overmyer et al. | 29/235 |

Primary Examiner—James L. Jones, Jr.
Attorney, Agent, or Firm—Julius L. Rubinstein

[57]            ABSTRACT

The tool comprises a frame with a roller rotatably mounted thereon. A molding contacting element is also positioned on the frame in such a way that when the base surface of a hard resilient molding engages said molding contacting element and the opposite surface of the molding engages the periphery of the roller, the molding is formed into a curve which decreases the width of the base portion of the molding. This decreases in width is just sufficient to permit the base of the curved portion of the molding to be inserted in a straight metal channel. When the molding is uncurved so it can lie straight in the metal channel, the width of the base of the molding increases enough to grip the sides of the channel to lock the molding in the channel.

32 Claims, 31 Drawing Figures

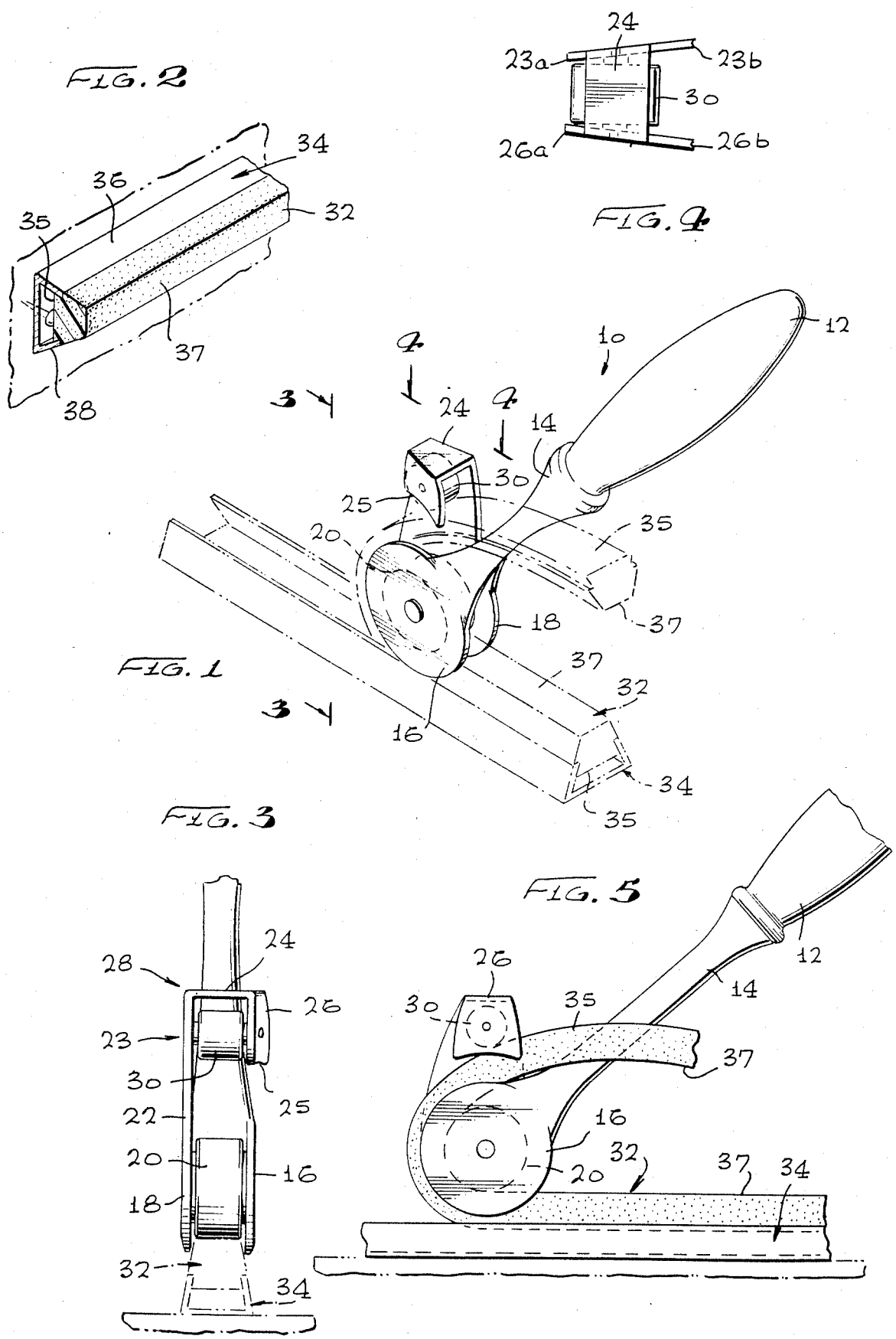

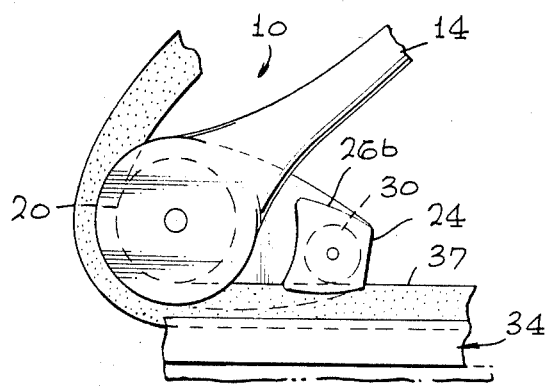
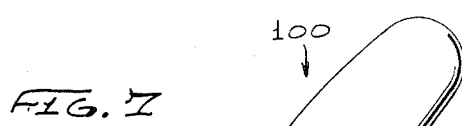
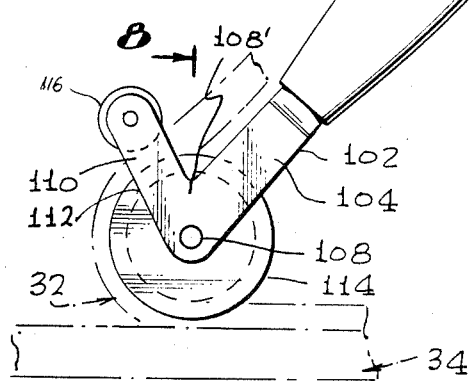
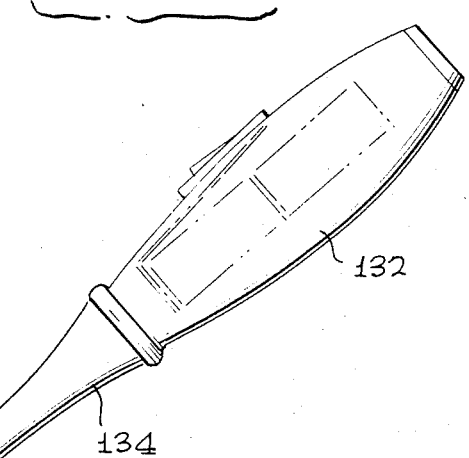
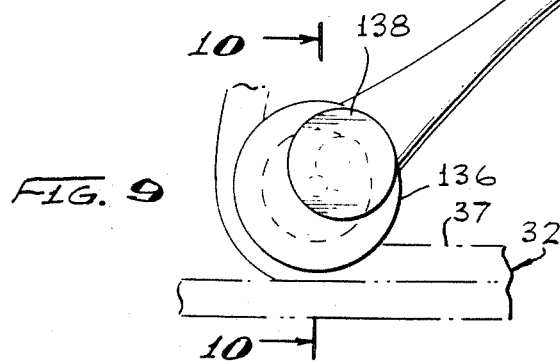
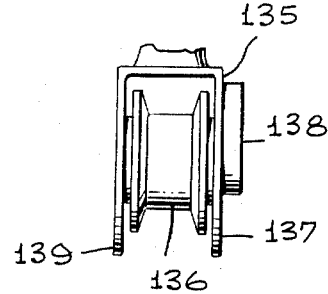

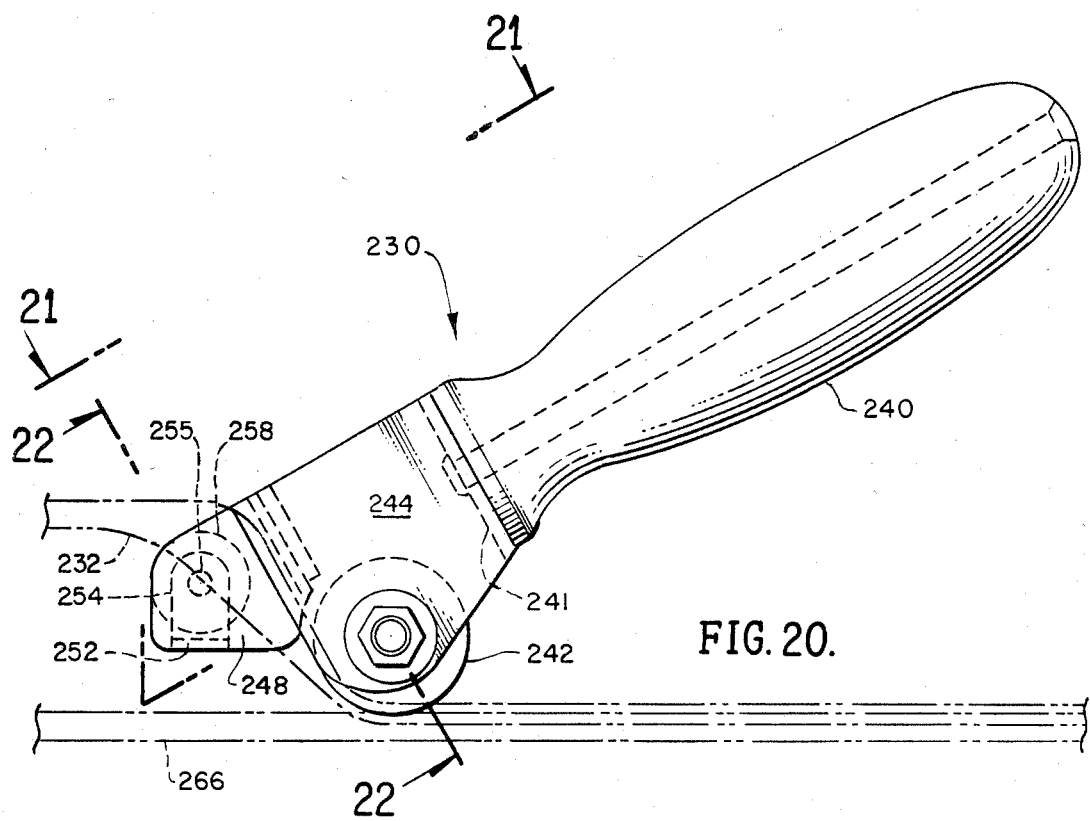
FIG. 20.
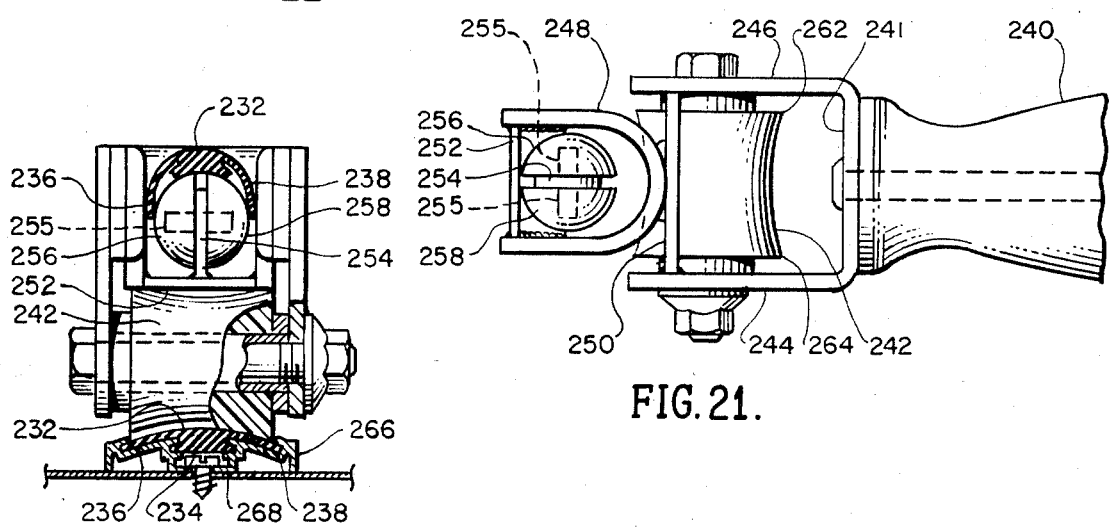
FIG. 21.
FIG. 22.
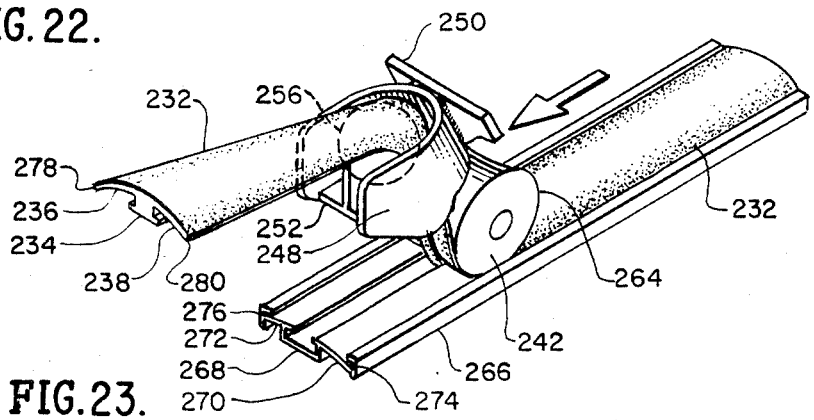
FIG. 23.

TOOL

This is a continuation in part of patent application No. 397,818, filed July 13, 1982, now abandoned.

This invention relates to a tool for installing a hard resilient molding into a channel.

BACKGROUND AND STATEMENT OF THE PROBLEM

Rubber moldings are commonly mounted on the sides of automobiles to protect car doors and the sides of the cars from dents or scratches, caused when doors of adjacently parked cars strike them as they are being opened. In addition, they are used anyplace where a surface has to be protected or decorated.

The rubber moldings are inserted in metal channels which are mounted on the sides of the cars. These metal channels typically comprise a base and attached side or leg portions. The leg portions of the channel may incline toward each other. The rubber moldings are often trapezoidal in cross-section, and the sides of the trapezoid adjacent the lower or larger base may be cut away to define shoulders which engage the free ends of the side or leg portions of the channel.

In order to protect the sides of the car and car doors from the above described dents and scratches, the rubber molding has to be fairly strong, so although it is resilient, it is too hard to compress or squeeze using hand strength alone. For time to time the rubber molding in these metal channels must be replaced or reinstalled because it falls out, or because it has become worn or damaged. Heretofore, this was difficult and time consuming, particularly when the channels were mounted on the sides of the car.

A number of tools have been developed which are used to insert gaskets or filler material in grooves or channels, but those tools are not suitable for inserting hard rubber moldings into metal channels mounted on the sides of the cars. This is because the pressure required to force the moldings into the channels while they are still on the car is so great that it can deform the metal sides of the car. Further, even if the metal channels are removed from the car in order to insert the moldings, the pressure required to force the hard rubber moldings into the metal channels could deform and bend the metal channels.

One tool similar in appearance to the novel tool disclosed herein is designed for inserting gasket material in channels, see the patent to Hohoff, U.S. Pat. No. 3,307,249. This patent discloses a gasket inserting tool for inserting gasket strips inside a channel. The gasket material, which can be easily compressed, is made of loosely woven rope formed from smaller diameter conductive wires. Hohoff, taking advantage of this compressible characteristic of the gasket material, has developed a tool which is in essence a roller having flexible guiding sides with a groove formed at its periphery. The flexible sides of the roller are bent so they fit between the legs of the channel, and are in rotatable engagement with the base of the channel, See FIG. 2. Then, as the tool is pushed along, the base of the gasket material is fed into the grooves of the roller while the roller rotates. In this way the gasket material is rotated between the legs of the channel and is held there by friction.

The Hohoff tool requires the gasket material to be easily compressible in order to function because the gasket material has to be squeezed to a thickness which is less than the width of the inner sides of the groove on the periphery of the wheel when the sides of the roller are inside the channel. If the material cannot be compressed that much, the tool would not work. Despite the similarity in appearance, the Hohoff patent does not work the same way as the present invention and cannot do what the present invention does.

The patent to Kruszona, U.S. Pat. No. 4,169,305, discloses a tool for inserting filler material in a crevice. It comprises a handle with a roller at one end. The periphery of the roller is sized to enter a crevice and push the filler material into the crevice to a predetermined depth, see FIG. 2. The patent to Allen, U.S. Pat. No. 2,761,199, discloses a similar tool.

Other tools, such as those disclosed in the patent to Barnett, U.S. Pat. Nos. 4,185,371, Sarvay, et al., 3,744,133 and Gruszecki, 2,533,367, are similar to each other in that they operate by having the tool enter the groove of the resilient molding or weather strip, so that a locking strip can be inserted into the spread groove. Then when the tool is removed, the groove embraces the locking strip which holds the groove spread for enough apart so that the weather strip or gasket or molding sealingly grips the metal or glass panels in a manner well known in the art.

None of the patents described above are directed to or can solve the problem this invention is concerned with because they depend on the resilience of the material forming the groove or the resilience of the softness of the material forming the filler. In contrast, this invention is concerned with the problem of how to insert comparatively hard rubber moldings into a comparatively rigid channel, without requiring the tool to enter the channel, and without requiring the exertion of such great force as to risk deforming the car doors or sides of the cars, or the sides of the channel.

What is needed, therefore, and comprises an important produce part of this invention, is to provide a tool for quickly and easily inserting a comparatively hard rubber molding into a metal channel without the exertion of great force.

Another object of this invention is to provide a tool which can hold a hard rubber molding to a predetermined curve, so that the curved portion of the molding can be easily inserted into a metal channel.

Still another object of this invention is to provide a method for inserting a hard rubber molding into a rigid channel without requiring great force.

These and other objects of this invention will become more apparent when better understood in light of the accompanying drawings and specifications wherein:

FIG. 1 is a perspective view of the tool constructed according to the principles of this invention.

FIG. 2 is a perspective view of a portion of a commonly used metal channel with a rubber molding inserted therein.

FIG. 3 is an elevational view taken on line 3—3 of FIG. 1.

FIG. 4 is a plan view taken on line 4—4 of FIG. 1 and showing the nonparallel sides of the portion of the frame of the tool holding a second roller.

FIG. 5 is a side elevational view of the tool shown in FIG. 3.

FIG. 6 discloses the tool shown in FIG. 1 in an alternate position on the work.

FIG. 7 is an elevational view of a modified version of the tool constructed according to this invention.

FIG. 8 is an elevational view taken of line 8—8 of FIG. 7.

FIG. 9 discloses a motor powered version of the tool constructed according to the principles of this invention.

FIG. 10 is an elevational view of the modification shown on FIG. 9, taken on line 10—10 of FIG. 9.

Figure 11:
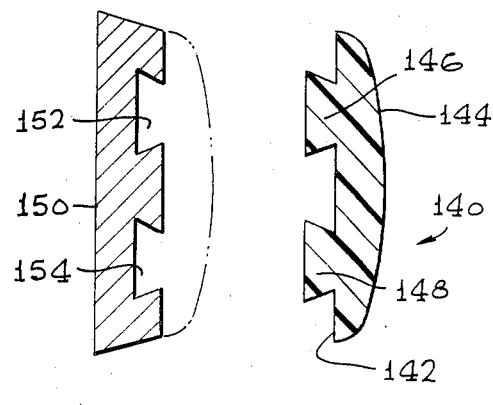

FIG. 11 is a sectional view of the cross-section of a dual channel designed to hold a molding having parallel base or anchor portions.

Figure 12:
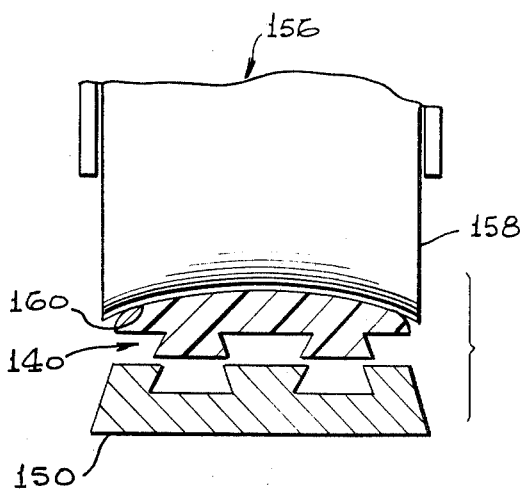

FIG. 12 is an enlarged view partly in section showing a roller shaped to engage the upper surface of the molding shown in FIG. 11.

Figure 13:
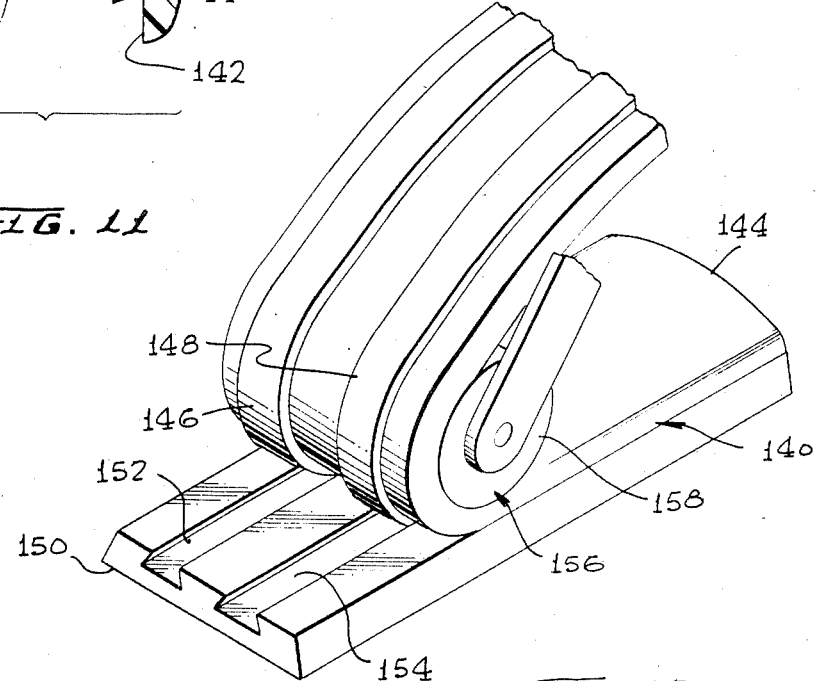

FIG. 13 is a perspective view showing a portion of a tool like that shown in FIG. 1, but with a pressure roller sized to engage the upper surface of the molding shown in FIG. 11.

Figure 14:
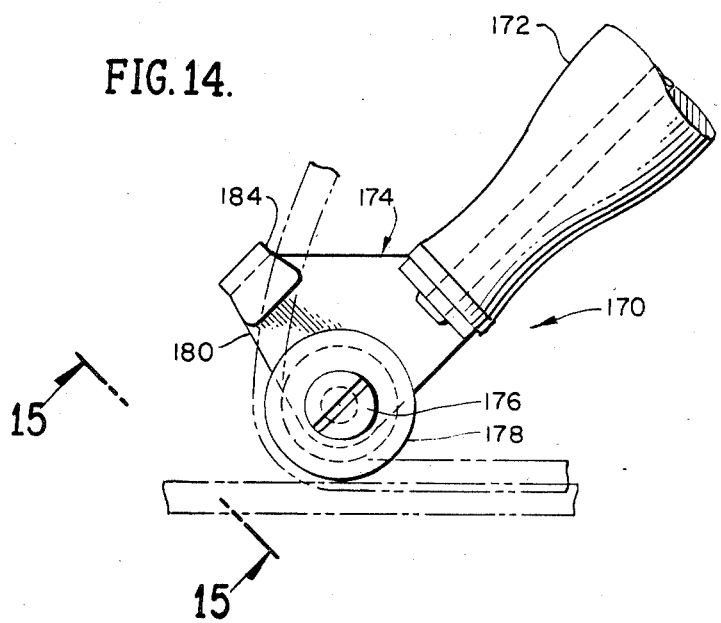

FIG. 14 is an elevational view of another modification of the tool constructed according to the principles of this invention.

Figure 15:
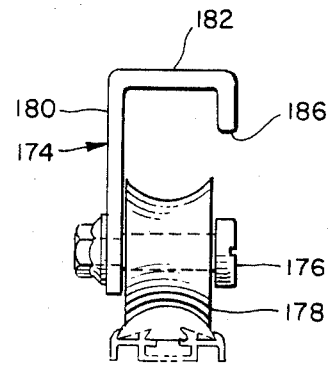

FIG. 15 is an end sectional view taken along line 15—15 of FIG. 14.

Figure 16:
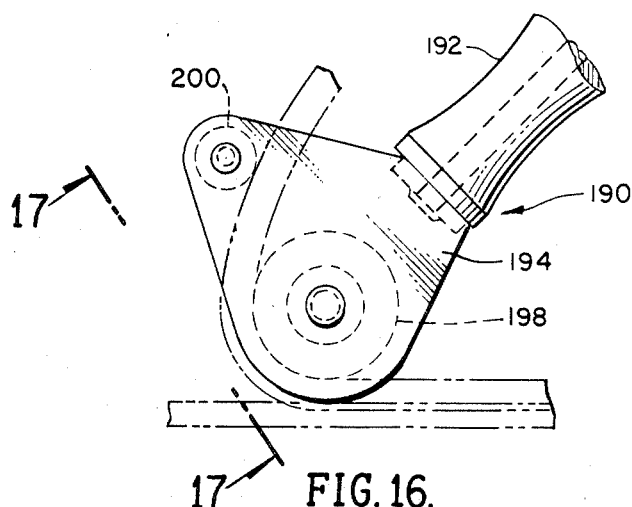

FIG. 16 is an elevational view of a further modification of the tool constructed according to the principles of this invention.

Figure 17:
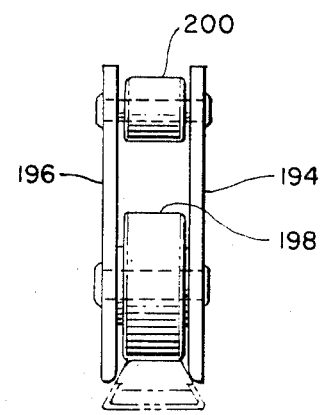

FIG. 17 is an end view taken along line 17—17 of FIG. 16.

Figure 18:
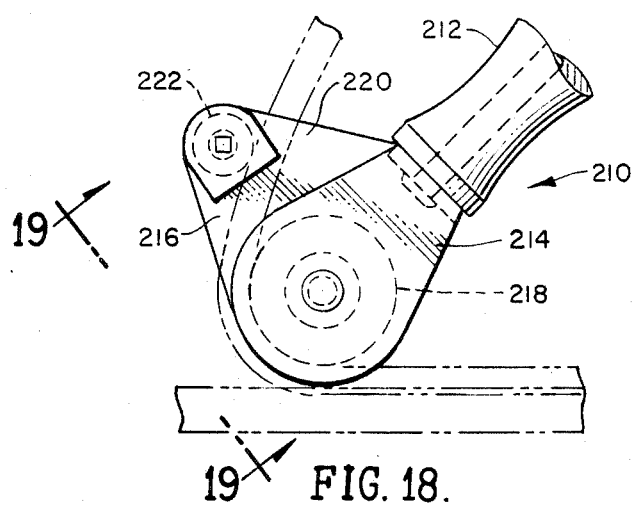

FIG. 18 is an elevational view of still another modification of the tool constructed according to the principles of this invention.

Figure 19:
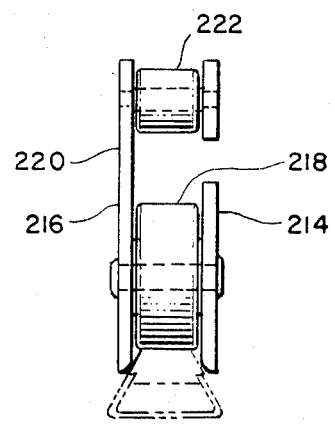

FIG. 19 is an end view taken along line 19—19 of FIG. 18.

FIG. 20 is a side elevational view of a modified tool constructed according to the principles of this invention but which is designed to insert a molding having a hard manually incompressible central portion and integrally attached thinner resilient flanges into a channel.

FIG. 21 is a plan view of the embodiment taken along line 21—21 of FIG. 20.

FIG. 22 is a sectional view taken of line 22—22 of FIG. 20.

FIG. 23 is a perspective view of the flange folding components of the modified tool shown in FIG. 20 showing the flanges of the molding being folded while the molding is moved through the tool.

Figure 24:
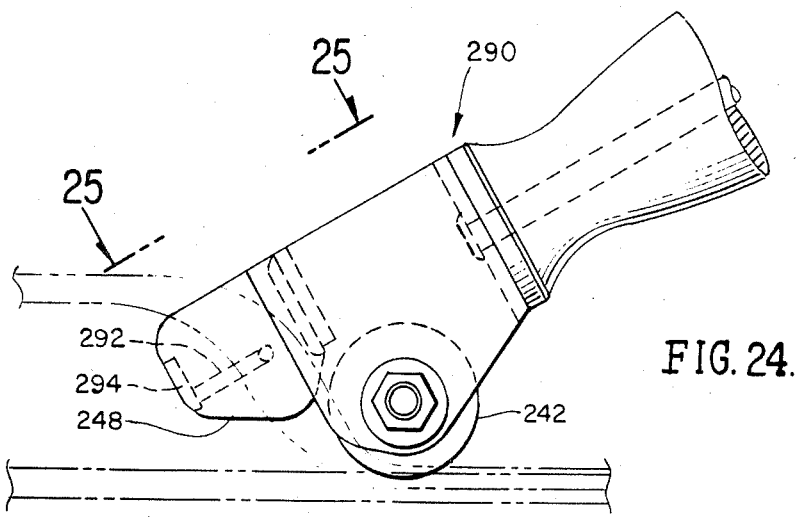

FIG. 24 is a side elevational view of a modified version of the tool shown in FIG. 20.

Figure 25:
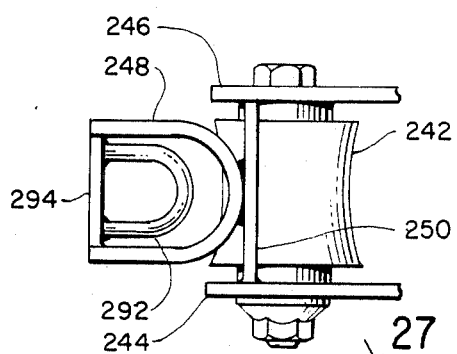

FIG. 25 is partial plan view taken along line 25—25 of FIG. 24.

Figure 26:
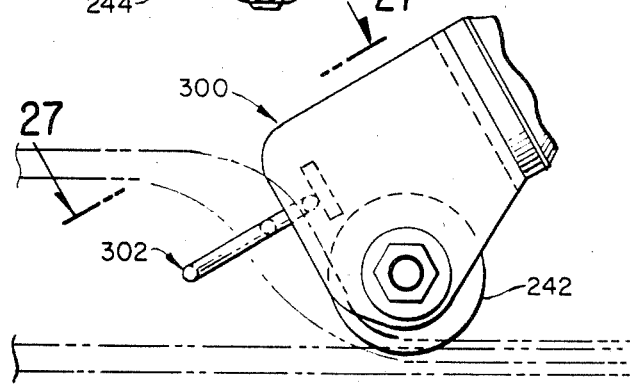

FIG. 26 is an elevational view of a portion of still another modified version of the tool shown in FIG. 20.

Figure 27:
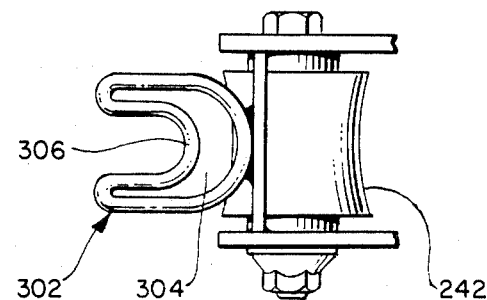

FIG. 27 is a partial plan view taken of line 27—27 of FIG. 26.

Figure 28:
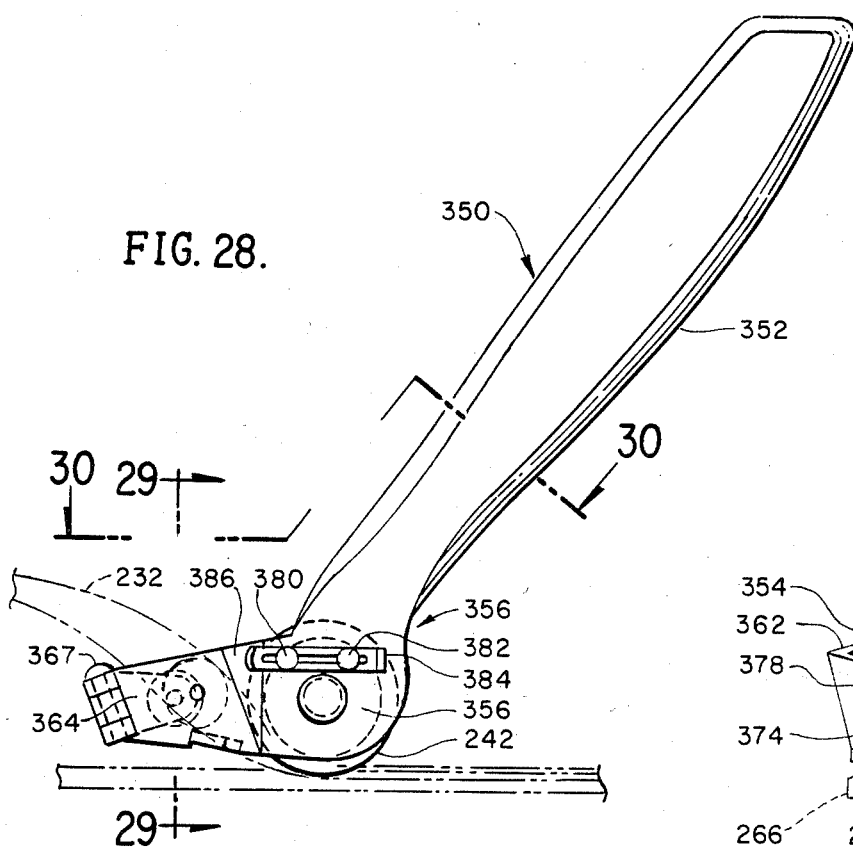

FIG. 28 is an elevational view of still another modification of the tool shown in FIG. 20, disclosing friction reducing cones.

Figure 29:
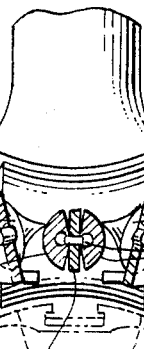

FIG. 29 is a sectional view of the tool taken along the line 29—29 of FIG. 28.

Figure 30:
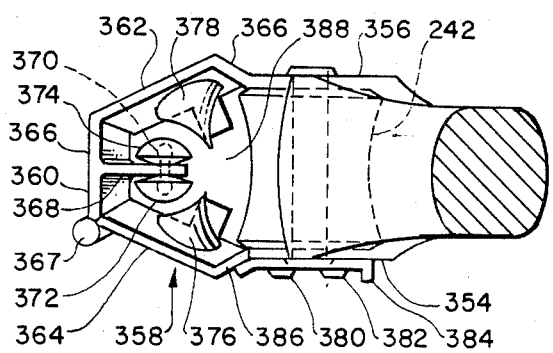

FIG. 30 is a sectional view taken along the line 30—30 of FIG. 20.

Figure 31:
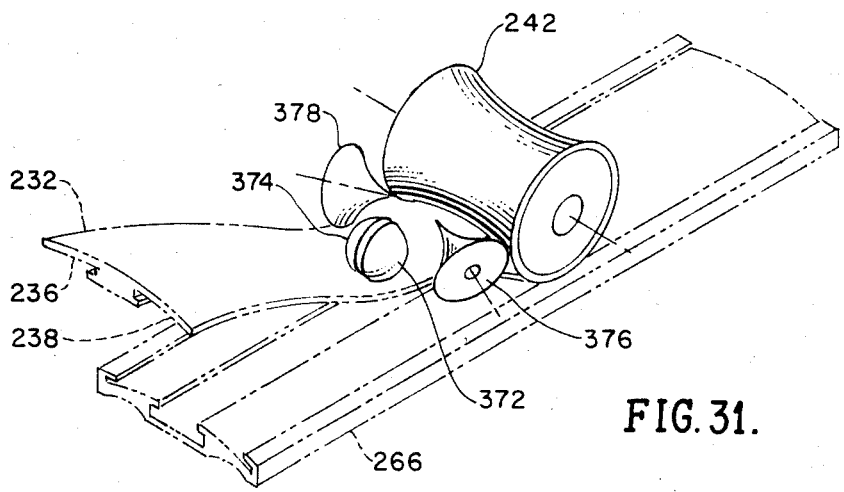

FIG. 31 is a perspective view of the flange folding component of the tool shown in FIG. 28.

Referring now to FIG. 1 of the drawings, a tool for inserting a comparatively hard rubber molding into a metal channel, indicated generally by the reference 10, comprises a frame consisting of a handle 12, a shank 14, and spaced parallel, side plates, 16 and 18. A first pressure roller 20 is rotatably mounted on a shaft between the side plates, see FIG. 3. Alternatively some other suitable pressure exerting device may be used.

Side plate 16 is generally circular. Side plate 18 has a generally circular portion with the same diameter as side plate 16 and, in addition, has an upwardly projecting portion 22. The upper end 23 of side portion 22 is bent transversely at 24 toward the plane of side plate 16 to form a base portion. The end 26 of the base portion 24 is bent transversely down toward side plate 16 to form an upper channel portion 28. The extreme end 25 of side portion 26 is spaced from the adjacent periphery of the side plate 16 a distance large enough to permit the molding to be inserted therebetween for easy insertion or removal of the molding from the tool, see FIGS. 3 and 5. A second roller or molding contacting element 30 is rotatably mounted on a shaft in the channel 28 between sides 23 and 26, and the roller 30 is in spaced parallel relationship to the roller 20, see FIG. 3. Sides 23 and 26 of channel 28 are inclined toward each other so that the spacing between their opposite end portions varies. In particular, as seen in FIG. 4, the separation between end portions 23a and 26a is less than the separation between the end portions 23b and 26b for reasons to be described below.

The rubber molding 32 shown installed in a metal channel 34 mounted on the side panel of a car, in FIG. 2 is typically formed from comparatively hard rubber or some similar resilient nonabrasive material. This material is difficult to compress without power tools. For that reason it is very difficult to force the rubber molding 32 into the channel 34 by a direct application of pressure. Moreover, the force required to press the molding into the channel by a direct application of pressure could be great enough to bend or deform the side panels of the car, or the sides of the channel.

In designing tool 10, advantage is taken of the fact that when the rubber molding is bent into a curve, as shown in FIG. 5, the width of the outer or base portion 35 of the molding will decrease because the material forming the base has to stretch a greater distance as compared to the opposite inner portion 37 of the molding. As seen in FIG. 2, the sides 36 and 38 of the metal channel incline somewhat toward each other in order to better lock the molding inside the channel after the molding has been inserted therein.

With this arrangement, if the molding 34 is selected so the width of the outer or base portion 35 of the molding is only slightly larger than the separation between the extreme ends of the sides 36 and 38 of the channel 34, when lying straight, and if the molding is bent into a proper curve, the width of the base portion 35 of the molding will decrease sufficiently so it can be inserted between the sides 36 and 38 of the channel 34 with little effort. Then when the molding lies straight inside the channel, the width of the outer portion 35 of the molding will increase so the molding will be locked inside the channel.

The tool 10 is designed to bend the molding into this proper curve. This requires the separation between the rollers 30 and 20 to be selected so that when the molding fits between the roller 30 and the roller 20 as shown in FIG. 5, the molding will be curved enough so it can be easily roller into the channel without the application of substantial force.

Upon portion 37 of the molding 32 in this embodiment happens to be flat, although this is not essential. This upper portion co-acts with the periphery of roller 20 which may have a corresponding shape. Consequently, when pressure is applied by the tool, the periphery of roller 20 pushes against portion 37 of the molding.

The radius of the curved portion of the side plates 16 and 18 is greater than the radius of roller 20 and the separation of the side plates 16 and 18 is a little greater than the width of portion 37 of the molding. In this way, roller 20 can directly engage upper portion 37 of the molding, and the roller will be guided directly over the upper portion of the molding by the side plates 16 and 18, see FIG. 3. This is important because the side plates 16 and 18 are not used to apply pressure to the molding. If they were, the pressure on the tool could bend them and damage the tool.

In the configuration shown in FIG. 5, the molding is positioned between rollers 20 and 30 with the base portion 35 of the molding between the rear or wide portions 23b and 26b of the sides of the channel 28, as shown in FIG. 3. In this arrangement, base portion 35 of the molding is embraced and guided by the ends 23b and 26b of the sides of the channel 28 which hold the base portion 35 of the molding against the roller 30 while the opposite portion 37 of the molding is guided by the side plates 16 and 18 which hold upper portion 37 of the molding against roller 20.

It is sometimes advantageous to be able to exert pressure on the molding at two closely spaced points as the tool is moved over the molding. Moreover, as the tool is moved over the end of the channel it is sometimes advantageous to be able to maintain pressure on the molding even after the roller 20 has rolled off the end of the channel in order to make certain the end of the molding is securely locked in the channel. To do this the tool can be applied to the work in the manner shown in FIG. 6.

When the tool 10 is applied to the work as shown in FIG. 6, the narrower opposite portion 37 of the molding is guided by the narrow end portions 23a and 26a of the sides of the channel 28, which hold portions 37 of the molding against roller 30. This is why the separation between end portions 23a and 26a must differ from the separation between end portions 23b and 26b.

When the tool 10 is moved over the molding, while applied to the work, as shown in FIG. 6, pressure is applied to the molding at two spaced locations by rollers 20 and 30. Moreover, when the roller 20 moves off the end of the channel 34, roller 30, still riding on the upper surface 37 of the molding can be made to exert pressure on this portion of the molding by rotating the handle 12 of tool 10 in a clockwise direction as the tool is forced over the work. This locks the end of the molding in the channel.

When using the tool as shown in FIG. 6, the user of the tool grasps handle 12 with one hand and with the other curves the upper portion 37 of the molding over the periphery of the roller 20 while the tool is moved over the work. This creates a curve having a shape which permits the molding to be inserted to the channel.

The modified tool 100 shown in FIG. 7 comprises a handle and a shank 102. The shank is formed from spaced legs 104 and 106 which are bent at 108 to form spaced feet 110 and 112. A first roller 114 is rotatably mounted between the spread legs on a pivot pin located at 108 and a second roller 116 is rotatably mounted between the spaced feet on a pin extending through the free ends of the feet. The rollers are spaced apart a distance sufficient to permit a molding to pass therebetween. Roller 114 has a peripheral groove 118 formed by inwardly beveled roller sides 120 and 122. In this way roller 114 can roll over the upper portion 37 of the molding 32 and the beveled sides of the roller provide the guiding function which holds the roller on the molding as the tool is pushed along. As seen in FIG. 8, the bevel of roller sides 120 and 122 are selected so they are parallel to the bevel of the sides of the molding. In this way the legs 104 and 106 of the shank 102 are not used to guide the molding over the roller 114.

The second roller 116 may have a cylindrical periphery so it can exert pressure on both surfaces 35 and 37 of the molding so that this embodiment can be used in the alternate positions shown in FIGS. 5 and 6.

Rollers 114 and 116 are spaced apart a distance such that when the molding is bent around roller 114 and passes between rollers 114 and 116 the curve of the molding will decrease the width of the base portion 35 of the molding just enough so it can be easily forced into channel 32.

In the modification shown in FIG. 9, the tool 130 comprises a handle 132 and a shank 134. The shank terminates in a downwardly open channel 135, see FIG. 10. A pressure roller 136 is rotatably mounted between the side plates 137 and 139 of the channel. The roller 136 may have a flanged periphery like the roller 114 shown in FIG. 8, so that it does not need a guide frame to stay on the molding 32. Alternatively, the roller could be like roller 20 shown in FIG. 3 with guide plates 16 and 18.

A motor 138 is mounted on the frame and is connected to roller 136 in such a way that operation of the motor causes the roller 136 to rotate. The motor can be connected to electrical power from an external source. Alternatively, the motor can be powered by air pressure.

With this arrangement, the pressure roller 116 is placed over the surface 37 of the molding 34 so it can exert pressure on the base surface 35 of the molding, while the operator of the tool holds the free end of the molding and bends it around the roller 136 to form a curve in the molding sufficient to permit the base portion 35 of the molding to be inserted into the channel 32 while the motor drives the tool over the molding.

FIGS. 11, 12 and 13 illustrate a recent trend in the design of moldings and channels. As seen, the molding support 150 is formed from metal or some other suitable material and is provided with spaced parallel rib receiving channels 152 and 154 which are generally trapezoidal in cross-section. This molding support is designed to be secured to the sides of a car or some other surface to be protected or decorated. The molding 140 is provided with two base or anchor ribs 146 and 148 which are also generally trapezoidal in crosssection and which are adapted to be inserted in said channels. As seen in FIG. 12, the lower base of ribs 146 and 148 is just a little wider than the entrance to the spaced channels 152 and 154. The opposite portion 144 of the molding 146 may be convex as shown.

The roller 156 is provided with a roller 158 which is rotatably mounted on the tool frame and which has a concave periphery so when it is forced against the convex surface of the molding it lies co-extensive with it for the better transfer of pressure, see FIGS. 12 and 13.

In use, the tool 156 works the same as the tool 10 shown in FIG 1. When the molding 140 is curved over the roller 158, as shown in FIG. 13, the width of the base of the anchor ribs 146 and 148 decreases just enough so they can be easily inserted in the channels 152 and 154.

The modified tool 170 shown in FIG. 14 comprises a handle 172. The frame 174, in the form of a side plate, is attached to the handle of the tool by any suitable means. A support axle 176 is bolted to the side plate as shown. A pressure roller 178 is rotatably mounted on the support axle. The rigid periphery of the pressure roller is channel shaped with radially inwardly extending sides and a radially inwardly spaced base which is rigid enough to engage and exert pressure on the surface of the molding opposite the base of the molding, see FIG. 15. The side plate 174 has a radially extending arm 180 which terminates in an inwardly open channel 182. The edge 184 of a channel 182 serves as a molding contacting element, see FIG. 14. The separation between the extreme edge 186 of the channel and the periphery of the pressure roller 178 is large enough to permit a molding to be inserted therebetween, see FIG. 15. The separation between the periphery of the pressure roller and the molding contacting element in all the various modifications of the tool disclosed herein is greater than the thickness of the molding to reduce bending forces on the molding. This is important because if the hard resilient molding were bent too sharply the molding could break, or the frictional resistance of the molding passing through the tool could make the tool hard to use. The surface 37 of the molding opposite the base surface 35 is curved around and under the periphery of the pressure roller with the molding contacting element 184 engaging the base surface 35 of the molding to form a curve which decreases the width of the molding. In this way if the base of the molding is then aligned with a molding receiving channel which is slightly narrower than the width of the base of the molding when it is uncurved, then by a small application of pressure the curved portion of the base of the molding can be inserted in the channel. Then when the molding is straightened in the channel the width of the base expands slightly locking the molding in the channel as described above in connection with the other tools.

The modified tool 190 shown in FIG. 16 comprises a handle 192. Spaced parallel side plates 194 and 196 are connected to the handle by any suitable means. A cylindrical pressure roller 198 is rotatably mounted between the side plates. The pressure roller has a rigid periphery strong enough the exert pressure on the molding as required. The side plates are spaced apart a distance slightly greater than the width of the pressure roller and the top part of the molding, and they have a dimension enough greater than the radius of the pressure roller extending in the axial direction of the handle, so that when the molding is on the tool, the side plates 194 and 196 engage the sides the molding and guide the pressure roller over the surface of the molding opposite the base of the molding, see FIG. 17.

A second roller 200 is rotatably mounted between the sides plates in spaced relationship to the pressure roller 198. The separation between the second roller and the pressure roller is like the separation between the periphery of the pressure roller and the molding contacting element described in the modified tool 170. With this arrangement a curve is formed in the base of the molding which permits easy insertion of the base of the molding into a channel as described above.

The modified tool 210 shown in FIG. 18 comprises a handle 212 and a pair of attached side plates 214 and 216. A pressure roller 218 is rotatably mounted between the side plates as shown. Side plate 216 has a radially extending portion 220. A second roller 222 is rotatably mounted on portion 220 by any suitable means. The spacing between the second roller and the pressure roller is large enough so the molding can be inserted between them as shown. The side plates 214 and 216 have a dimension greater enough than the radius of the pressure roller extending in the axial direction of the handle and they are spaced apart sufficiently so the extended portions of the side plates embrace and guide the pressure roller over the surface of the molding opposite the base of the molding, see FIG. 19. The coaction between the base of the molding and the second roller and the engagement between the opposite surface of the molding and the periphery of the pressure roller forms the molding into a curve so that the molding can be inserted into a channel, as described in connection with the other embodiment of this invention.

The modified tool 230 shown in FIG. 20 is designed to insert a different kind of molding into a channel. The molding 232 this tool is concerned comprises a central portion 234 which is hard and manually incompressible, and attached side flanges 236 and 238 which are much more resilient than the central portion 234, see FIG. 23. This requires changes in the design of the tool in comparison to the tools that were described above in order to insert molding 232 into a correspondingly shaped channel. Tool 230 has a handle 240 and an attached channel shaped frame. The frame comprises a base plate 241 and spaced parallel side plates 244 and 246 attached to the handle as shown in FIG. 21. A pressure roller 242 is rotatably mounted between the side plates 244 and 246. The periphery of the pressure roller 242, for reasons to be described below, has radially projecting guide edges 262 and 264, see FIGS. 21 and 22. The tool also includes a generally U or channel shaped flange folding member 248 with an attached mounting plate 250, see FIG. 23. This mounting plate is attached between the side plates 244 and 246 in spaced relationship to the periphery of the pressure roller. This spacing is sufficient to permit the molding to pass through the channel shaped folding member 248 and around and under the pressure roller 242, see FIGS. 21 and 23.

A T-shaped roller support comprising a base 252 and a perpendicular centrally disposed flange 254 is mounted between the legs of the folding channel shaped member 248, see FIGS. 21, 22 and 23. An axle in the form of a pin 255 extends through the centrally disposed flange 254 and a pair of molding contacting elements comprising semi-spherical friction reducing rollers 256 and 258 are rotatably mounted on the pin, see FIG. 21.

In operation, the molding 232 is passed through the channel shaped folding member 248 and over the rollers 258 and 260, see FIGS. 22 and 23. The engagement between flanges 236 and 238 of the molding and the inner surfaces of the legs and web of the channel shaped folding member 246 bend or fold the flanges 236 and 238 of the molding over the rollers 256 and 258 as shown in FIG. 22. Then the molding is passed under the pressure roller 242 with the upper surface of the molding engaging the periphery of the pressure roller. This curves the molding and this curve decreases the width of the comparatively hard manually incompressible central portion 234 as described above.

A molding receiving channel 266 designed to receive the molding 232 has a central disposed channel 268 dimensioned to receive the central portion 234 of the molding. The channel has exended flange receiving portions 270 and 272 attached to the opposite edges of the central molding channel 268, see FIG. 23. The extreme ends of the flanges 270 and 272 of the molding receiving channel are bent to form edge receiving channels 274 and 276 for receiving the opposite edges 278 and 280 of the molding 232.

When the molding is folded over the rollers 256 and 258 as described above and with the manually incompressible central portion 234 of the molding 232 aligned with the centrally disposed channel 268 of the molding receiving channel 266, then a small application of pressure by the pressure roller 242 is sufficient to force the curved central portion 234 of the molding into the centrally disposed channel 268 as described above in connection with the prior tools. The radially projecting peripheral edges 262 and 264 of the pressure roller riding on the upper surface of the edges 278 and 280 of the molding flanges 236 and 238 and guided by the edges of the flanges 274 and 276 as seen in FIGS. 21 and 23 prevent the molding from unfolding in the short distance between the channel shaped folding member 248 and the periphery of the pressure roller. Consequently, the width of the folded molding when it first reaches the channel 266 is less than the width of the spacing between the facing edges of the flanges 274 and 276, see FIG. 23. In this way, if the tool is forced in the direction shown by the arrow in FIG. 23 while the molding is forced through the tool, the central portion 34 of the molding becomes locked in the central channel 268 as described in connection with the prior tools. In addition, the edges 278 and 280 of the molding after passing under the pressure roller, unfold in the channel shaped recesses below flanges 274 and 276 and are locked therein. In this way the molding can be rapidly inserted in the channel by pulling the tool in the direction shown in FIG. 23 and forcing the molding to go through the tool.

The modified tool 290 shown in FIG. 24 differs from tool 230 shown in FIG. 20 in that a curved wire 292 sufficiently rigid to withstand the pressure of the molding is mounted on a support 294. The ends of the support 294 are all attached to the extreme ends of the channel shaped folding member 248 as shown in FIG. 25 in place of the rollers 25 8and 260. The molding passing through the folding member 248 is folded against the wire 292 and then passes around and under the pressure roller 242. In all other respects, the tool functions the same as the tool described in FIG. 20.

The modified tool 300 shown in FIG. 26 differs from the tool shown in FIGS. 20 and 24 in that a nesting double channel shaped wire 302 is substituted for the channel shaped folding member 248, the wire 292, and the rollers 258 and 266. In this embodiment the molding is forced through the space 304 in the nesting channel shaped wire 302. This folds the flanges 278 and 280 of the molding 282 around the wire portion 306 in space 304, and the molding then passes around and under the pressure roller 242. In all other respects the tool functions the same way as the tool shown in FIGS. 20 and 24.

The modified tool 350 shown in FIG. 28 comprises a handle 352 and a flange folding structure 358. Spaced side plates 354 and 356 are attached to the base of the handle 352. The molding folding structure 358 which is generally channel shaped comprises a base member 360 and attached diverging leg members 362 and 364, see FIG. 30. The end 366 of the leg member 362 is attached to side plate 356. Leg member 364 is pivotally connected to the base member 360 by pivot 367, so that the leg functions as a door and can be opened to provide access to the interior of the tool for inserting or removal of the molding. An upstanding support 368 is centrally mounted on the base member 360 extending perpendicular therefrom. An axle 370 extends through said support. A pair of semi-spherical rollers 372 and 374 are rotatably mounted on the axle 370. In addition, conical rollers 376 and 378 are rotatably mounted on leg members 362 and 364 extending transverse to the plane of the leg members for reasons to be described below, see FIG. 30. Leg member 364 is releasably held against side plate 354 by a latching mechanism. This mechanism comprises spaced pins 380 and 382 having enlarged heads mounted on the side plate 354 as shown in FIGS. 28 and 29. A slotted latching member 384 is movably mounted on the side plate 354 with the pins 380 and 382 moving in the slot. The latching member 384 in its forward position covers the edge 386 of the leg 364 so it cannot be opened, see FIGS. 28 and 30. When the latching member is pushed back, the edge 386 of the leg 364 is uncovered so it can be pivoted open.

The pressure roller 242 is rotatably mounted between the side plates 354 and 356, see FIGS. 28 and 30. In use, the molding 232 is inserted in the space 388 inside the flange folding structure and is passed around and under the roller 242. The flanges 236 and 238 of the molding engage conical rollers 376 and 378 and are folded thereby around the roller segments 372 and 374, as shown in FIGS. 30 and 31. The co-action between the conical rollers 376 and 378 with roller segments 372 and 374 greatly reduces the friction when the molding is forced through the tool, making it much easier to operate the tool. In all other respects, tool 350 functions the same way as tool 230 shown in FIG. 20.

Having shown and described the invention, what I claim is:

1. An apparatus of the class described comprising in combination a hand operated tool, a molding receiving channel, and a hard resilient molding, said molding having a base surface and an opposite surface, said tool comprising a frame, said frame including an axially extending shank, said shank comprising spaced parallel legs, a pressure roller rotatably mounted between said legs, feet attached to said legs, a molding contacting element mounted between the ends of the feet, said pressure roller and said molding contacting element spaced apart a distance sufficient to permit a molding to pass therebetween, said pressure roller having a periphery, the periphery of said pressure roller rigid enough to engage and exert pressure on the surface of the molding opposite the base of the molding, the surface of the molding opposite the base of the molding curved around and under the periphery of the pressure roller forming a curve which decreases the width of the base of the molding, said channel having spaced sides, the base of the molding aligned with said channel under the pressure roller, the separation between the sides of said channel smaller than the width of the molding when the molding is uncurved by an amount such that when the molding forms said curve, the width of the base of the molding decreases enough so that by a small application of pressure against the opposite surface of the molding, the base of the curved molding can be inserted in said channel, and when the molding lies straight in the channel the width of the molding increases and locks the molding in the channel.

2. The apparatus described in claim 1 wherein said molding contacting element is a second roller.

3. The tool described in claim 1 including a motor connected to the tool for for driving the tool over the surface of the molding.

4. An apparatus of the class described comprising in combination a hand operated tool, a molding receiving channel, and a hard manually incompressible resilient molding, said molding having a base surface and an opposite surface, said tool comprising a frame, said frame including an axially extending handle and a pair of rigid guide plates in fixed relation to said handle, a pressure roller rotatably mounted between said guide plates, said pressure roller having an outer work contacting periphery rigid enough to engage and exert pressure on the surface of the molding opposite the base of the molding, said guide plates spaced apart a distance slightly larger than the width of the pressure roller at its outer periphery and the width of said opposite surface of said molding to guide the pressure roller over said opposite surface of the molding, a molding contacting element on said frame, the surface of the molding opposite the base of the molding curved around and under the periphery of the pressure roller with the base of the molding engaging the molding contacting element to form a curve which decreases the width of the base of the molding, said molding receiving channel including spaced sides, the base of the molding aligned with said channel under the pressure roller, the separation between the sides of the channel smaller than the width of the molding when the molding is uncurved by an amount such that when the molding forms said curve the width of the molding decreases enough so that by a small application of pressure by the pressure roller against the said opposite surface of the molding the curved portion of the molding can be inserted in the channel whereby when the molding lies straight in the channel the width of the molding increases and locks the molding in the channel, said guide plates having a dimension slightly greater than the radius of the pressure roller at least in the axial direction of the handle, so that when force is applied to said handle, said guide plates engage the sides of the molding and guide the pressure roller as it is rolls along said opposite surface of the molding, whereby the base of the molding can be rapidly inserted into said channel.

5. The apparatus described in claim 4 wherein said molding contacting element is a second roller rotatably mounted on said frame positioned so when the base of the molding engages the periphery of the second roller the opposite surface of the molding engages the periphery of the first roller.

6. An apparatus of the class described comprising in combination a hand operated tool, a molding receiving channel, and a hard resilient molding, said molding having a base surface and an opposite surface, said tool comprising a frame, said frame including an axially extending handle and a rigidly attached shank, said shank comprising spaced parallel legs, each of said legs having a first portion and an integrally attached second portion, said second portion at an angle to said first portion defining a knee portion, a pressure roller rotatably mounted between said knee portions, a molding contacting element connected at the end of the said second portions, said pressure roller and said molding contacting element spaced apart a distance sufficient to permit a molding to pass therebetween, said pressure roller having an outer work contacting periphery rigid enough to engage and exert pressure on the surface of the molding opposite the base of the molding, the surface of the molding opposite the base of the molding curved around and under the periphery of the pressure roller with the base of the molding engaging the work contacting element to form a curve which decreases the width of the base of the molding, and rigid guide means in axial alignment with said axially extending handle engaging at least a part of the sides of the molding to guide the outer periphery of the pressure roller as it is rolled along said opposite surface of the molding, said molding receiving channel including spaced sides, the separation between the sides of the channel slightly smaller than the width of the molding when the molding is uncurved by an amount such that when the molding forms said curve, the decrease in the width of the base of the molding is sufficient so that by a small application of pressure by the pressure roller against the said opposite surface of the molding the curved portion of the molding can be inserted in the channel, and when the molding lies straight in the channel, the width of the molding increases and locks the molding in the channel.

7. The apparatus described in claim 6 wherein said molding contacting element is separated from the periphery of the pressure roller by a distance greater than the thickness of the molding to reduce bending forces on the molding.

8. A hand operated tool for inserting an elongated manually incompressable resilient molding into a channel comprising a frame, said frame including an axially extending handle and a rigidly attached shank, said shank comprising spaced parallel leg portions, said leg portions bent to form spaced parallel legs and feet, a pressure roller rotatably mounted between said legs, a molding contacting element mounted between the ends of the feet, said pressure roller and said molding contacting element spaced apart a distance sufficient to permit a molding to pass therebetween, said pressure roller having a channel shaped periphery including radially inwardly extending sides and a radially inwardly spaced base, said radially inwardly spaced base rigid enough to engage and exert pressure on the surface of the molding opposite the base of the molding, the radius of the pressure roller such that when the molding is curved over the periphery of the pressure roller and engages the said molding contacting element the molding forms a curve which decreases the width of the base of the molding enough so that if the separation between the sides of the channel is slightly less than the width of the channel when the molding is uncurved, then by a small application of pressure against the opposite surface of the molding when the molding forms said curve and the base of the molding is aligned with said channel, the base of the molding can be inserted in said channel, said inwardly extending sides of the periphery of the pressure roller rigid enough to guide the pressure roller and engage at least a part of the sides of the molding while the radially inwardly spaced base of the pressure roller is rolled along the said opposite surface of the molding so that when pressure is applied by said handle, the base of the molding can be rapidly rolled into said channel.

9. The hand operated tool described in claim 8 wherein the pressure roller has an external peripheral groove formed by inwardly beveled sides.

10. A hand tool for inserting a manually incompressible hard resilient molding into a channel where the width of the base of the molding to be inserted into the channel is slightly larger than the separation between the sides of the channel comprising a frame, said frame including a pair of side plates integral with said frame and mounted in spaced parallel relationship to each other, a pressure roller rotatably mounted between said side plates, said pressure roller cylindrical in shape with a work contacting periphery for engaging and exerting pressure on the surface of the molding opposite said base of the molding, said side plates spaced apart a distance slightly larger than the width of the base of the molding and having a dimension enough greater than the radius of the pressure roller and extending in a direction such that when the molding is on the tool, said side plates embrace the sides of the molding and guide the surface of the molding opposite said base of the molding over the periphery of the pressure roller, one of said side plates having a radially extending arm portion terminating in a radially inwardly open channel portion, a molding contacting element, said molding contacting element mounted in said inwardly open channel portion, said channel portion dimensioned so there is a separation between the extreme ends of the side of the channel and the periphery of the adjacent side plate, said separation large enough to permit the molding to be inserted therebetween and for easy removal of the molding from the tool, said molding contacting element positioned so when said molding is inserted in said tool with said molding contacting element engaging the base of the molding and the opposite surface of the molding curving over the periphery of the pressure roller a curve is formed in the molding which decreases the width of the base of the molding enough so that if the separation between the sides of the channel is slightly less than the width of the base of the molding when the molding is uncurved, then by a small application of pressure by the periphery of the pressure roller against the surface of the molding opposite said base of the molding when the base of the molding is aligned with said channel, the base of the molding can be inserted into said channel.

11. A hand tool for inserting a manually incompressible hard resilient molding into a channel where the width of the base of the molding to be inserted into the channel is slightly larger than the separation between the sides of the channel comprising a frame, said frame including a pair of rigid side plates integral with said frame and mounted in spaced parallel relationship to either other, a first roller rotatably mounted between said side plates, said first roller cylindrical in shape with a work contacting periphery for engaging and exerting pressure on the surface of the molding opposite said base of the molding, said side plates spaced apart a distance slightly larger than the width of the base of the molding and having a dimension enough greater than the radius of the first roller and extending in a direction such that when the molding is on the tool said side plates embrace the sides of the molding and guide the surface of the molding opposite said base of the molding over the periphery of the first roller, one of said side plates having a radially extending arm portion terminating in a radially inwardly open channel, a second roller, said second roller rotatably mounted in said inwardly open channel, the arms of said inwardly open channel being longer than the radius of the second roller, the spacing between the adjacent edges of one side of said arms of said channel greater than the width of the base of the molding so the base of the molding can fit between said adjacent edges whereby said adjacent edges embrace and guide the base of the molding against said second roller, the spacing between the adjacent edges of the opposed ends of the arms of the channel sized to embrace and guide the sides of the surface of the molding opposite said base of the molding whereby the tool can be used in a first position with the base of the molding embraced and guided by the adjacent edges of one side of the arms of the channel against the second roller while the opposite surface of the molding is curved over the periphery of the first roller to provide the molding with the fixed curve, and the tool can be applied to the work in a second position wherein the adjacent opposite edges of the arms of the channel embrace the sides of the surface of the molding opposite said base of the molding whereby said second roller can roll over said opposite surface of the molding and exert pressure thereon while said first roller engages said opposite surface of the molding and exerts pressure thereon at a second location on the molding, said second roller positioned so when said molding is inserted in said tool in such a way that the molding curves over the periphery of the first roller, a curve is formed in the molding which decreases the width of the base of the molding enough so that if the separation between the sides of the channel is slightly less than the width of the base of the molding when the molding is uncurved, then by a small application of pressure by the peripheries of the first and second rollers against the surface of the molding opposite said base of the molding when the base of the molding is aligned with said channel, the base of the molding can be rapidly rolled into said channel.

12. The hand operated tool described in claim 8 wherein the periphery of said pressure roller is channel shaped including radially inwardly extending sides and a radially inwardly extending base, said inwardly extending sides of the periphery of the pressure roller rigid enough to guide the pressure roller and engage at least a part of the sides of the molding so that when the pressure roller is rolled along said opposite surface of the molding while pressure is applied by said pressure roller, the base of the molding can be rapidly rolled into said channel.

13. An apparatus of the class described comprising in combination a hand operated tool, a molding receiving channel, and a hard resilient molding, said molding having a base surface and an opposite surface, said tool comprising a frame, said frame including at least one side plate, a pressure roller rotatably mounted on said side plate, said pressure roller cylindrical in shape and with a rigid periphery for exerting pressure on the surface of the molding opposite the base of the molding, said side plate having a radially extending arm portion terminating in a radially inwardly open channel, said channel dimensioned so there is a separation between the extreme ends of the sides of the channel and the periphery of the pressure roller which is large enough to permit the molding to be inserted therebetween, said channel portion including a molding contacting element on said side plate, said molding contacting element separated from the rigid periphery of the pressure roller by a distance greater than the thickness of the molding to reduce bending forces on the molding, the surface of the molding opposite the base of the molding curved around and under the periphery of the pressure roller with the base of the molding engaging said molding contacting element to form a curve which decreases the width of the base of the molding said molding receiving channel including spaced sides, the separation between the sides of the channel smaller than the width of the molding when the molding is uncurved by an amount such that when the molding forms said curve the width of the base of the molding decreases enough so that by a small application of pressure against the said opposite surface of the molding, the curved portion of the molding can be inserted in the channel whereby when the molding lies straight in the channel, the width of the molding increases and locks the molding in the channel.

14. The apparatus described in claim 13 wherein the periphery of said pressure roller is channel shaped and has radially inwardly extending sides and a radially inwardly spaced base, the radially inwardly extending sides of the periphery of the pressure roller engaging the sides of the molding to guide the pressure roller over the molding, the periphery of the pressure roller rigid enough to force the curved base of the molding into the channel so that when the pressure roller is rolled along said opposite surface of the molding while pressure is applied by said pressure roller, the base of the molding can be rapidly rolled into said channel.

15. An apparatus of the class described comprising in combination a hand operated tool, a molding receiving channel, and a hard resilient molding, said molding having a base surface and an opposite surface, said tool comprising a frame, said frame comprising spaced parallel side plates, a pressure roller rotatably mounted between said side plates, the periphery of the pressure roller rigid enough to engage and exert pressure on the surface of the molding opposite the base of the molding, a molding contacting element mounted between said side plates, said molding contacting element separated from the rigid periphery of the pressure roller by a distance greater than the thickness of the molding to reduce bending forces on the molding, the surface of the molding opposite the base of the molding curved around and under the periphery of the pressure roller with the base of the molding engaging said molding contacting element to form a curve which decreases the width of the base of the molding, said molding receiving channel including spaced sides, the separation between the sides of the channel smaller than the width of the molding when the molding is uncurved by an amount such that when the molding forms said curve the width of the base of the molding decreases enough so that by a small application of pressure by the pressure roller against the said opposite surface of the molding the curved portion of the molding can be inserted in the channel and when the molding lies straight in the channel the width of the molding increases and locks the molding in the channel.

16. The tool described in claim 15 wherein said molding contacting element is a second roller rotatably mounted between said side plates.

17. An apparatus of the class described comprising in combination a hand operated tool, a molding receiving channel, and a hard resilient molding, said molding having a base surface and an opposite surface, said tool comprising a frame, said frame including spaced parallel side plates in fixed relationship to said frame, a pressure roller rotatably mounted between said side plates, said pressure roller cylindrical in shape with a rigid periphery for exerting pressure on the surface of the molding opposite the base of the molding, said side plates spaced apart a distance slightly larger than the base of the molding, and having a dimension enough greater than the radius of the pressure roller in a direction such that when the molding is on the tool, said fixed side plates embrace the sides of the molding and guide the surface of the molding opposite the base of the molding over the periphery of the pressure roller, one of said side plates having a radially extending arm portion, a molding contacting element on said radially extending arm portion, said molding contacting element separated from the rigid periphery of the pressure roller by a distance greater than the thickness of the molding to reduce bending forces on the molding, the surface of the molding opposite the base of the molding curved around and under the periphery of the pressure roller with the base of the molding engaging said molding contacting element to form a curve which decreases the width of the base of the molding, said molding receiving channel including spaced sides, the separation between the sides of the channel smaller than the width of the molding when the molding is uncurved by an amount such that when the molding forms said curve, the the width of the base of the molding decreases enough so that by a small application of pressure by the pressure roller against the said opposite surface of the molding, the curved portion of the molding can be inserted in the channel and when the molding lies straight in the channel the width of the base of the molding increases and locks the molding in the channel.

18. The tool described in claim 16 wherein said molding contacting element is a second roller rotatably mounted on said radially extending arm portion.

19. An apparatus of the class described comprising in combination a hand operated tool, a molding receiving channel, and a hard resilient molding, said molding having a base surface and an opposite surface, said tool comprising a frame, a pressure roller rotatably mounted on said frame, said pressure roller having a rigid outer work contacting periphery for exerting pressure on the surface of a molding opposite the base of a molding, a molding contacting element on said frame, said molding contacting element separated from the periphery of the pressure roller by a distance greater than the thickness of the molding to reduce bending forces on the molding, the surface of the molding opposite the base of the molding curved around and under the periphery of the pressure roller with the base of the molding engaging said molding contacting element to form a curve which decreases the width of the base of the molding said molding receiving channel including spaced sides the separation between the sides of the channel enough less than the width of the molding when the molding is uncurved so that by a small application of pressure by the pressure roller against said opposite surface of the molding when the base of the molding is aligned with said channel and while the molding forms said curve, the base of the molding can be inserted in said channel, and guide means on said tool for guiding the pressure roller over the said molding whereby the base of the molding can be rapidly inserted into said channel.

20. A apparatus of the class described comprising in combination a hand operated tool, a molding receiving channel, and a hard resilient molding, said molding having a base surface and an opposite surface, said tool comprising a frame, a pressure roller rotatably mounted in said frame, said pressure roller having a rigid outer work contacting periphery for exerting pressure on the said opposite surface of the molding, a molding contacting element on said frame, the surface of the molding opposite the base of the molding curved around and under the periphery of the pressure roller with the base of the molding engaging said molding contacting element to form a curve which decreases the width of the molding, said molding receiving channel including spaced sides, the separation between the sides of the channel smaller than the width of the molding when the molding is uncurved by an amount such that when the molding forms said curve the decease in the width of the base of the molding is sufficient to insert the base of the molding into the channel by a small application of pressure by the pressure roller against the said opposite surface of the molding whereby when the molding lies uncurved in the channel the width of the molding increases and locks the molding in the channel.

21. The apparatus described in claim 20 wherein said molding contacting element is separated from the periphery of the pressure roller by a distance greater than the thickness of the molding to reduce bending forces on the molding.

22. An apparatus of the class described comprising in combination a tool, a molding receiving channel, and a molding, said molding having a resilient manually incompressible portion and a thinner more resilient flange portion on the side of the incompressible portion and having a base surface and an opposite surface, said tool comprising a frame said frame including spaced parallel side plates, a pressure roller rotatably mounted between said side plates, said pressure roller having an outer periphery rigid enough to engage and exert pressure on the surface of the molding opposite the base of the molding, flange folding means attached to said frame, said flange folding means having a molding contacting element mounted thereon and positioned so as the molding is drawn through said tool, the surface of the molding opposite the base of the molding curves around and under the pressure roller to decreases the width of the base of said incompressible portion of the molding while the base surface of the molding engages the molding contacting element in such a way that the flange portion of the molding is folded around said molding contacting element, said channel having a recess shaped to receive said incompressible portion of the molding and having a molding flange receiving portion, the edge of said molding flange receiving portion of the channel having an edge receiving recess formed thereon for receiving the edge of the flange of the molding, the width of said channel slightly larger than the width of the molding when the flange of the molding is folded, said pressure roller having guide means for engaging and exerting sufficient pressure on the edge of the molding while the pressure roller is over the channel on the molding, to prevent the flange of the molding from unfolding until the pressure roller moves away from said portion of the molding, the separation between the sides of said recess smaller than the width of the incompressible portion of the molding when the molding is straight by an amount such that when the incompressible portion of the molding forms said curve, the decrease in the width of said incompressible portion of the molding is sufficient so that by a small application of pressure by the pressure roller against the incompressible portion of the molding, the said portion of the molding can be inserted in said recess, whereby when said pressure roller rolls away from said portion of the molding in the recess, the molding straightens and the width of the base portion of the molding increases locking in the recess, while the folded flange of the molding unfolds into the edge receiving recess on the channel.

23. An apparatus of the class described comprising in combination a hand operated tool, a molding receiving channel, and a hard resilient molding, said molding having a base surface and an opposite surface, said tool comprising a frame, said frame including an axially extending shank, said shank comprising spaced parallel legs, a pressure exerting device mounted between said legs, feet attached to said legs, a molding contacting element mounted between the ends of the feet, said pressure exerting device and said molding contacting element spaced apart a distance sufficient to permit the molding to pass therebetween, said pressure exerting device having a periphery, the periphery of said pressure exerting device rigid enough to engage and exert pressure on the surface of the molding opposite the base of the molding, the surface of the molding opposite the base of the molding curved around and under the periphery of the pressure exerting device forming a curve which decreases the width of the base of the molding, said channel having spaced sides, the base of the molding aligned with said channel under the pressure exerting device, the separation between the sides of said channel smaller than the width of the molding when the molding is uncurved by an amount such that when the molding forms said curve, the width of the base of the molding decreases enough so that by a small application of pressure against the opposite surface of the molding, the base of the curved molding can be inserted in said channel, and when the molding lies straight in the channel the width of the molding increases and locks the molding in the channel.

24. A hand tool for inserting a manually incompressible hard resilient molding into a channel where the width of the base of the molding to be inserted into the channel is slightly larger than the separation between the sides of the channel, comprising a frame, said frame including a pair of side plates integral with said frame and mounted in spaced parallel relationship to each other, a pressure exerting device mounted between said side plates, said pessure exerting device having a work contacting periphery for engaging and exerting pressure on the surface of the molding opposite said base of the molding, said side plates spaced apart a distance slightly larger than the width of the base of the molding and having a dimension enough greater than a dimension of the pressure exerting device extending in a direction such that when the molding is on the tool, said side plates embrace the sides of the molding and guide the surface of the molding opposite said base of the molding over the periphery of the pressure exerting device, one of said side plates having a radially extending arm portion terminating in a radially inwardly open channel portion, a molding contacting element, said molding contacting element mounted in said inwardly open channel portion, said channel portion dimensioned so there is a separation between the extreme ends of the side of the channel and the periphery of the adjacent side plate, said separation large enough to permit the molding to be inserted therebetween and for easy removal of the molding from the tool, said molding contacting element positioned so when said molding is inserted in said tool with said molding contacting element engaging the base of the molding and the opposite surface of the molding curving over the periphery of the pressure exerting device a curve is formed in the molding which decreases the width of the base of the molding enough so that if the separation between the sides of the channel is slightly less than the width of the base of the molding when the molding is uncurved, then by a small application of pressure by the periphery of the pressure exerting device against the surface of the molding opposite said base of the molding when the base of the molding is aligned with said channel, the base of the molding can be inserted into said channel.

25. An apparatus of the class described comprising in combination a hand operated tool, a molding receiving channel, and a hard resilient molding, said molding having a base surface and an opposite surface, said tool comprising a frame, said frame including at least one side plate, a pressure exerting device mounted on said side plate, said pressure exerting device having a rigid periphery for exerting pressure on the surface of the molding opposite the base of the molding, said side plate having a radially extending arm portion terminating in a radially inwardly open channel, said channel dimensioned so there is a separation between the extreme ends of the sides of the channel and the periphery of the pressure exerting device which is large enough to permit the molding to be inserted therebetween, said channel portion including a molding contacting element on said side plate, said molding contacting element separated from the rigid periphery of the pressure exerting device by a distance greater than the thickness of the molding to reduce bending forces on the molding, the surface of the molding opposite the base of the molding curved around and under the periphery of the pressure exerting device with the base of the molding engaging said molding contacting element to form a curve which decreases the width of the base of the molding, said molding receiving channel including spaced sides, the separation between the sides of the channel smaller than the width of the molding when the molding is uncurved by an amount such that when the molding forms said curve the width of the base of the molding decreases enough so that by a small application of pressure against the said opposite surface of the molding, the curved portion of the molding can be inserted in the channel whereby when the molding lies straight in the channel, the width of the molding increases and locks the molding in the channel.

26. An apparatus of the class described comprising in combination a hand operated tool, a molding receiving channel, and a hard resilient molding, said molding having a base surface and an opposite surface, said tool comprising a frame, a pressure exerting device mounted on said frame, said pressure exerting device having a rigid outer work contacting periphery for exerting pressure on the surface of the molding opposite the base of a molding, a molding contacting element on said frame, said molding contacting element separated from the periphery of the pressure exerting device by a distance greater than the thickness of the molding to reduce bending forces on the molding, the surface of the molding opposite the base of the molding curved around and under the periphery of the pressure exerting device with the base of the molding engaging said molding contacting element to form a curve which decreases the width of the base of the molding, said molding receiving channel including spaced sides, the separation between the sides of the channel enough less than the width of the molding when the molding is uncurved so that by a small application of pressure by the pressure exerting device against the opposite surface of the molding when the base of the molding is aligned with said channel and while the molding forms said curve, the base of the molding can be inserted in said channel, and guide means on said tool for guiding the pressure exerting device over the said molding whereby the base of the molding can rapidly inserted into said channel.

27. A tool for inserting a molding having a hard manually incompressible resilient central portion and thinner more resilient flange portions on each side of the central portion into a correspondingly shaped channel, having portions for receiving the resilient flanges of the molding, comprising a frame, said frame including spaced parallel side plates, a pressure exerting device mounted between said side plates, said pressure exerting device having a rigid outer periphery for exerting pressure on the surface of the molding opposite the base of the molding, flange folding means attached to said frame, said flange folding means having a molding contacting element mounted thereon, said molding contacting element separated from the rigid periphery of the pressure exerting device by a distance greater than the thickness of the molding to reduce bending forces and friction on the molding as it passes through said tool, said flange folding means positioned to engage the flanges of the molding as the molding is drawn through said tool, said molding contacting element positioned so when the flange folding means engage the flanges of the molding, the flanges of the molding are folded over the molding contacting element, and means associated with said pressure exerting device for preventing the folded flanges of the molding underneath the pressure exerting device from unfolding until after the pressure exerting device moves away from that part of the molding leaving the folded flanges of the molding free to unfold into the flange receiving portions on the channel.

28. A tool for inserting a molding having a hard manually incompressible resilient central portion and thinner more resilient flange portions on each side of the central portion into a correspondingly shaped channel having portions for receiving the resilient flanges of the molding comprising a frame, said frame including spaced parallel side plates, a pressure exerting device mounted between said side plates, said pressure exerting device having a rigid outer periphery for exerting pressure on the surface of the molding opposite the base of the molding, flange folding means attached to said frame comprising a support, said support including spaced legs, said spaced legs having facing surfaces, a molding contacting element mounted between said legs, said molding contacting element separated from the rigid periphery of the pressure exerting device by a distance greater than the thickness of the molding to reduce bending forces and friction on the molding as it passes through said tool, the separation between the facing surfaces of the spaced legs of the support less than the width of the unfolded molding, the position of said molding contacting element between said spaced legs such that when the molding is drawn between said spaced legs the base of the molding engages the molding contact element while the sides of the flanges of the molding engage the facing surfaces of the spaced legs of the support, whereby the flanges of the molding are folded over the molding contacting element, and means associated with said pressure exerting device for preventing the folded flanges of the molding underneath the pressure exerting device from unfolding until after the pressure exerting device moves away from that part of the molding leaving the folded flanges of the molding free to unfold into the flange receiving recesses on the channel.

29. The tool described in claim 28 wherein said molding contacting element is a generally spherically shaped friction reducing roller so that the molding can be drawn through said tool more easily.

30. The tool described in claim 28 wherein said flange folding means is generally channel shaped and said molding contacting element is a generally channel shaped wire parallel to an inwardly spaced from said flange folding means, said molding contacting element positioned so the engagement between the flanges of the molding and the molding contacting means as the molding passes in the space between the flange folding means and the molding contacting element, bends the flanges of the molding over the web portion of the channel shaped molding contacting means.

31. The tool described in claim 28 wherein said flange folding means is a generally channel shaped wire and said flange in said molding contacting means is a generally channel shaped wire parallel to an inwardly spaced from said flange folding means, said molding contacting element positioned so the engagement between the flanges of the molding and the molding contacting means as the molding passes in the space between the channel shaped wires of the flange folding means and the channel shaped molding contacting element, bends the flanges of the molding over the web portion of the wire channel shaped molding contacting element.

32. The tool described in claim 28 wherein said flange folding means includes a base wall and diverging legs, a friction reducing generally spherical roller mounted on said base wall, friction reducing conical rollers rotatably mounted on said diverging legs, said conical rollers extending in a direction generally perpendicular to said diverging legs, said conical rollers and said friction reducing pressure roller spaced from each other and positioned in such a way that as the molding is drawn through said tool, the flanges of the molding engage said conical rollers and are thereby folded around the generally spherical roller whereby the molding can be more easily drawn through said tool.

* * * * *